United States Patent
Aiba et al.

(10) Patent No.: US 9,435,899 B1
(45) Date of Patent: Sep. 6, 2016

(54) RADIOACTIVE GAS MONITORING DEVICE

(71) Applicant: MITSUBISHI ELECTRIC CORPORATION, Chiyoda-ku, Tokyo (JP)

(72) Inventors: Toshihide Aiba, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/864,021

(22) Filed: Sep. 24, 2015

(30) Foreign Application Priority Data

May 21, 2015 (JP) .................. 2015-103380

(51) Int. Cl.
| | |
|---|---|
| *G01T 1/20* | (2006.01) |
| *G01T 1/208* | (2006.01) |
| *G01T 1/203* | (2006.01) |
| *G21C 17/00* | (2006.01) |
| *G01T 1/29* | (2006.01) |

(52) U.S. Cl.
CPC ............... *G01T 1/208* (2013.01); *G01T 1/203* (2013.01); *G01T 1/2008* (2013.01); *G01T 1/2018* (2013.01); *G01T 1/2992* (2013.01); *G21C 17/00* (2013.01)

(58) Field of Classification Search
CPC .... G01T 1/2992; G01T 1/2008; G21C 17/00
USPC ....................................... 250/364
See application file for complete search history.

(56) References Cited

U.S. PATENT DOCUMENTS 3,849,655 A * 11/1974 Martucci ............... G01M 3/228
250/356.2

FOREIGN PATENT DOCUMENTS

| JP | 62-049282 A | 3/1987 |
| JP | 62-228186 A | 10/1987 |
| JP | 1-250883 A | 10/1989 |
| JP | 2001-337167 A | 12/2001 |
| JP | 2007-225569 A | 9/2007 |
| JP | 2010-145319 A | 7/2010 |

* cited by examiner

*Primary Examiner* — David Porta
*Assistant Examiner* — Meenakshi Sahu
(74) *Attorney, Agent, or Firm* — Buchanan Ingersoll & Rooney PC

(57) ABSTRACT

A radioactive gas monitoring device includes a sample chamber into which a sampled gas is introduced; a plastic scintillation detector outputting first detection signal pulses; an inorganic crystal scintillation detector outputting second detection signal pulses; a first measurement unit calculating a first count rate from the first detection signal pulses to output the first count rate, and issuing a first alert when the first count rate becomes higher than a first preset level and issuing a second alert when the first count rate becomes higher than a second preset level higher than the first preset level; and a second measurement unit calculating a second count rate from the second detection signal pulses to output the second count rate, and issuing a third alert when the second count rate becomes higher than a third preset level.

10 Claims, 11 Drawing Sheets

Figure 4

$$\sigma 1 = 1/(2 \cdot n1 \cdot \tau 1)^{1/2} \quad \text{Equation (1)}$$

$$\tau 1 = 1/[2 \cdot n1 \cdot (\sigma 1)^2] \quad \text{Equation (2)}$$

$$T1 = 2 \cdot \tau 1 \quad \text{Equation (3)}$$

$$n1(\text{current}) = n1(\text{previous}) \cdot \{1 - \alpha(\text{previous})\} + [N1(\text{current}) / \Delta T] \cdot \alpha(\text{previous}) \quad \text{Equation (4)}$$

$$\alpha(\text{previous}) = 1 - \exp[-\Delta T / \tau 1(\text{previous})] \quad \text{Equation (5)}$$

$$\tau 1(\text{previous}) = 1/[2 \cdot n1(\text{previous}) \cdot (\sigma 1)^2] \quad \text{Equation (6)}$$

Figure 5

$$\sigma 2 = 1/(2 \cdot n2 \cdot \tau 2)^{1/2} \quad \text{Equation (7)}$$

$$\tau 2 = 1/[2 \cdot n2 \cdot (\sigma 2)^2] \quad \text{Equation (8)}$$

$$T1 = 2 \cdot \tau 1 \quad \text{Equation (9)}$$

$$n2(\text{current}) = n1(\text{previous}) \cdot \{1 - \alpha(\text{previous})\} + [N2(\text{current}) / \Delta T] \cdot \alpha(\text{previous}) \quad \text{Equation (10)}$$

$$\alpha(\text{previous}) = 1 - \exp[-\Delta T / \tau 2(\text{previous})] \quad \text{Equation (11)}$$

$$\tau 2(\text{previous}) = 1/[2 \cdot n2(\text{previous}) \cdot (\sigma 2)^2] \quad \text{Equation (12)}$$

RADIOACTIVE GAS MONITORING DEVICE

FIELD OF THE INVENTION

The present invention relates to radioactive gas monitoring devices, and more particularly to a radioactive gas monitoring device that detects radiation emitted from a sampled gas.

BACKGROUND OF THE INVENTION

A radioactive gas monitoring device is provided in the containment vessel of a pressurized-water nuclear power plant to detect leakage of the primary coolant. The primary coolant leaking into the containment vessel diffuses into the air in the vessel, and the air is sampled as a sampled gas into the sample chamber of the detector unit. Fission products (radioactive noble gases) contained in the sampled gas emit beta rays. The radioactive gas monitoring device detects the beta rays with a radiation detector.

"Guideline for Radiation Monitoring of Nuclear Power Plants (Japan Electric Association Guide (JEAG) 4606-2003)" has been stipulated as a Japanese national guideline regarding radiation monitoring. The radioactive gas monitoring device calculates using its measurement unit a count rate of detection signal pulses output from the detector. When the count rate becomes higher than a preset level, an alert is issued to give notice to operators and necessary system isolation is automatically performed by using the alert as an interlock signal.

Typical radioactive nuclei to be produced depend on the conditions of the fuel cladding tubes inserted in the nuclear reactor. Specifically, radioactive noble gases such as Xe-133, Xe-135, and Kr-85 are main measurement object in a case of a high fuel failure rate. The lower the fuel failure rate is, the more the concentration of nuclear fission products reduces, which leads a radioactive substance such as F-18 to manifest itself and become dominant. Generally, radioactive gas monitoring devices detect beta rays emitted from radioactive novel gases with a plastic scintillation detector (see Patent Documents 1 to 6, for example).

PRIOR ART DOCUMENT

Patent Document

Patent Document 1: JP 2010-145319 A
Patent Document 2: JP S62-049282 A
Patent Document 3: JP S62-228186 A
Patent Document 4: JP H01-250883 A
Patent Document 5: JP 2001-337167 A
Patent Document 6: JP 2007-225569 A

Problem that the Invention is to Solve

As described above, the radioactive gas monitoring device is targeted at measuring radioactive noble gases of nuclear fission products; hence, fuel quality and a fuel failure rate affect sensitivity of detecting leakage of the primary coolant. Accordingly, it is required to suppress influence of the fuel failure rate on the sensitivity of detecting the leakage since improvement in fuel quality lowers the of leakage detection sensitivity.

The present invention is made to resolve the above problem, and aimed at providing a radioactive gas monitoring device that is capable of stably and reliably detecting leakage of the primary coolant in a containment vessel even under the condition of a low fuel failure rate.

SUMMARY OF THE INVENTION

Means for Solving the Problem

A radioactive gas monitoring device according to the present invention includes a sample chamber into which a sampled gas is introduced; a plastic scintillation detector detecting radiation emitted from the sampled gas introduced into the sample chamber and outputting first detection signal pulses; an inorganic crystal scintillation detector detecting radiation emitted from the sampled gas introduced into the sample chamber and outputting second detection signal pulses; a first measurement unit calculating a first count rate from the first detection signal pulses to output the count rate, and issuing a first alert when the first count rate becomes higher than a first preset level and issuing a second alert when the first count rate becomes higher than a second preset level higher than the first preset level; and a second measurement unit calculating a second count rate from the second detection signal pulses to output the count rate, and issuing a third alert when the second count rate becomes higher than a third preset level.

Advantageous Effect of the Invention

A radioactive gas monitoring device according to the present invention has a radiation detector (an inorganic crystal scintillation detector) that detects a positron-annihilation gamma ray, to output second detection signal pulses. A second measurement unit receives the second detection signal pulses and calculates a second count rate to output the second count rate, and issues an alert when the second count rate becomes higher than a preset level. Therefore, leakage of the primary coolant into the containment vessel can be detected with stable detection sensitivity independent of a fuel failure rate.

BRIEF DESCRIPTION OF THE DRAWINGS

FIG. 4 shows equations (1) to (6) for explaining the present invention;

FIG. 5 shows equations (7) to (12) for explaining the present invention;

DETAILED DESCRIPTION OF PREFERRED EMBODIMENTS

Radioactive gas monitoring devices according to the embodiments of the present invention will be described hereinafter with reference to the accompanying drawings. Note that, the same or similar constituent components in each drawing are designated at the same numeral references. In addition, while the radioactive gas monitoring devices is further configured with a plurality of members in actuality, for simplicity of description, descriptions are made only for parts necessary to describe and are omitted for the other parts.

Embodiment 1

Figure 1:
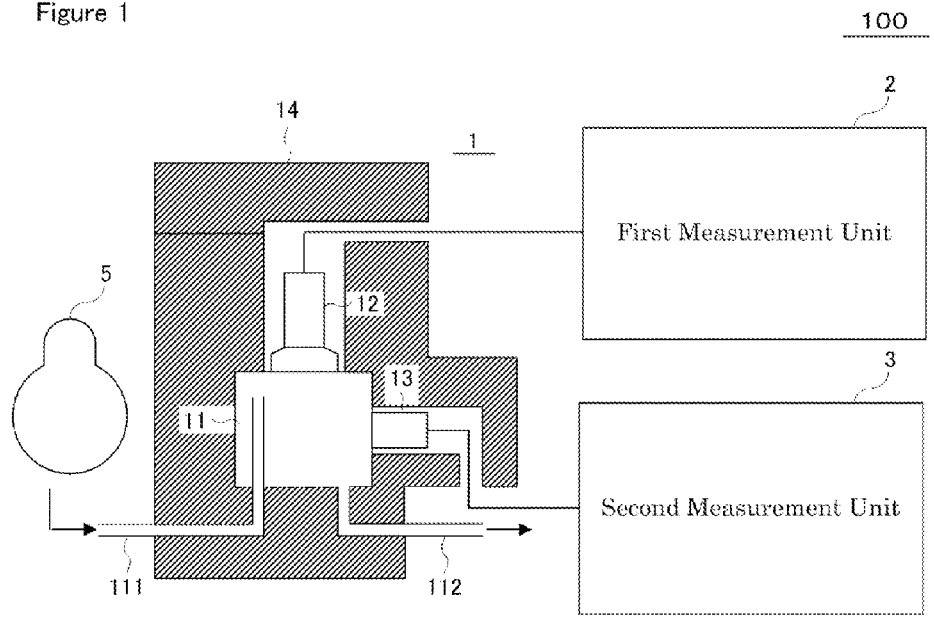
FIG. 1 is a diagram showing a configuration of a radioactive gas monitoring device according to the present invention.

Embodiment 1 of the present invention is described below with reference to the relevant figures. FIG. 1 shows a configuration of a radioactive gas monitoring device according to Embodiment 1. The radioactive gas monitoring device 100 is configured with a detector unit 1, a first measurement unit 2, and a second measurement unit 3. The detector unit 1 introduces the air in the containment vessel 5 as a sampled gas into a sample chamber 11 through an inlet nozzle 111 and exhausts the air through an outlet nozzle 112 while keeping a constant flow rate. A first radiation detector 12 detects beta rays emitted from radioactive noble gases contained in the sampled gas, to output first detection signal pulses. A second radiation detector 13 detects positron-annihilation gamma rays emitted from F-18 and the like contained in the sampled gas. A shield wall 14 encloses the sample chamber 11, the first radiation detector 12, and the second radiation detector 13 to shield them from environmental gamma rays.

The beta-ray incident surface of the first radiation detector 12 forms an upper part of the sample chamber 11 and is contact with the sampled gas. The second radiation detector 13 is disposed in the vicinity of the lateral outside of the sample chamber 11. A plastic scintillation detector, which is easily available and has a high sensitivity to beta rays and a relatively low sensitivity to gamma rays, is applicable to the first radiation detector 12. An inorganic crystal scintillation detector, which is easily available and outputs a detection signal pulse whose height value is proportional to energy absorbed from an incident gamma ray, is applicable to the second radiation detector 13. While a cylindrical NaI (Tl) scintillator, which is cheap and easily available, is preferably used as the inorganic crystal scintillator, a BGO ($Bi_4Ge_3O_1$) scintillator, a CsI (Tl) scintillator, or the like can also be used. In addition, a sphere-shaped one is also applicable.

Figure 2:
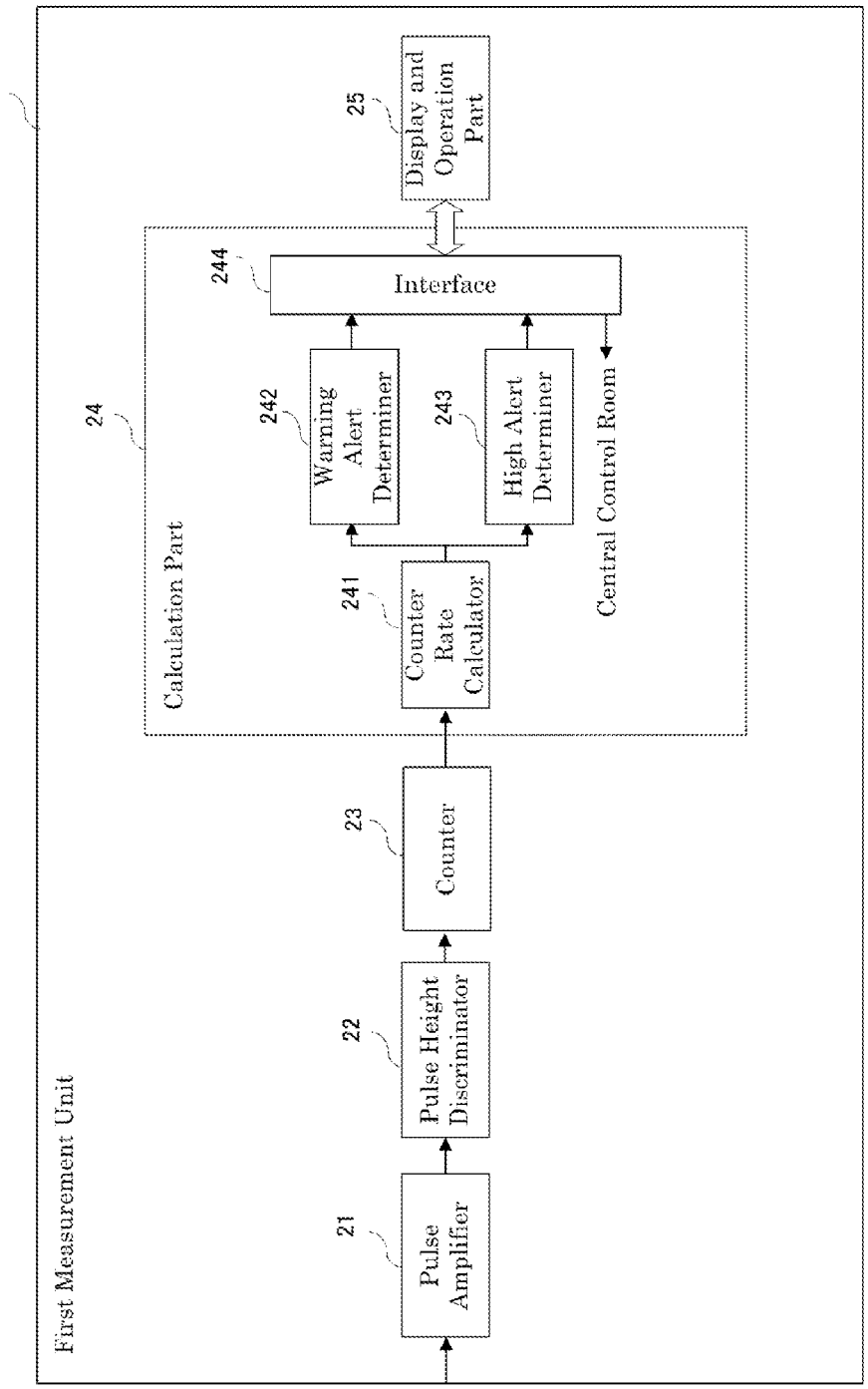
FIG. 2 is a block diagram showing a configuration of a first measurement unit according to Embodiment 1 of the present invention.

FIG. 2 shows a configuration of the first measurement unit 2 according to Embodiment 1. A pulse amplifier 21 receives and amplifies the first detection signal pulses (first digital pulses) output from the first radiation detector 12. A pulse height discriminator 22 receives the amplified first detection signal pulses and discriminates therefrom pulses whose heights are higher than a preset noise height level, to output the discriminated digital pulses. A counter 23 counts the digital pulses to output a first count value N1. In a calculation part 24, a count rate calculator 241 receives the first count value to calculate and output a first count rate n1; a warning alert determiner 242 issues a first warning alert (a first alert) when the first count rate becomes higher than a first preset warning-alert level (a first level); a high alert determiner 243 issues a high alert (a second alert) when the first count rate becomes higher than a high alert level (a second level) that is preset above the first warning alert; and an interface 244 is connected to a central control room to control input/output of the calculation part 24. A display and operation part 25 displays output of the calculation part 24, and allows for setting the calculation part 24 through the display and operation part.

Figure 3:
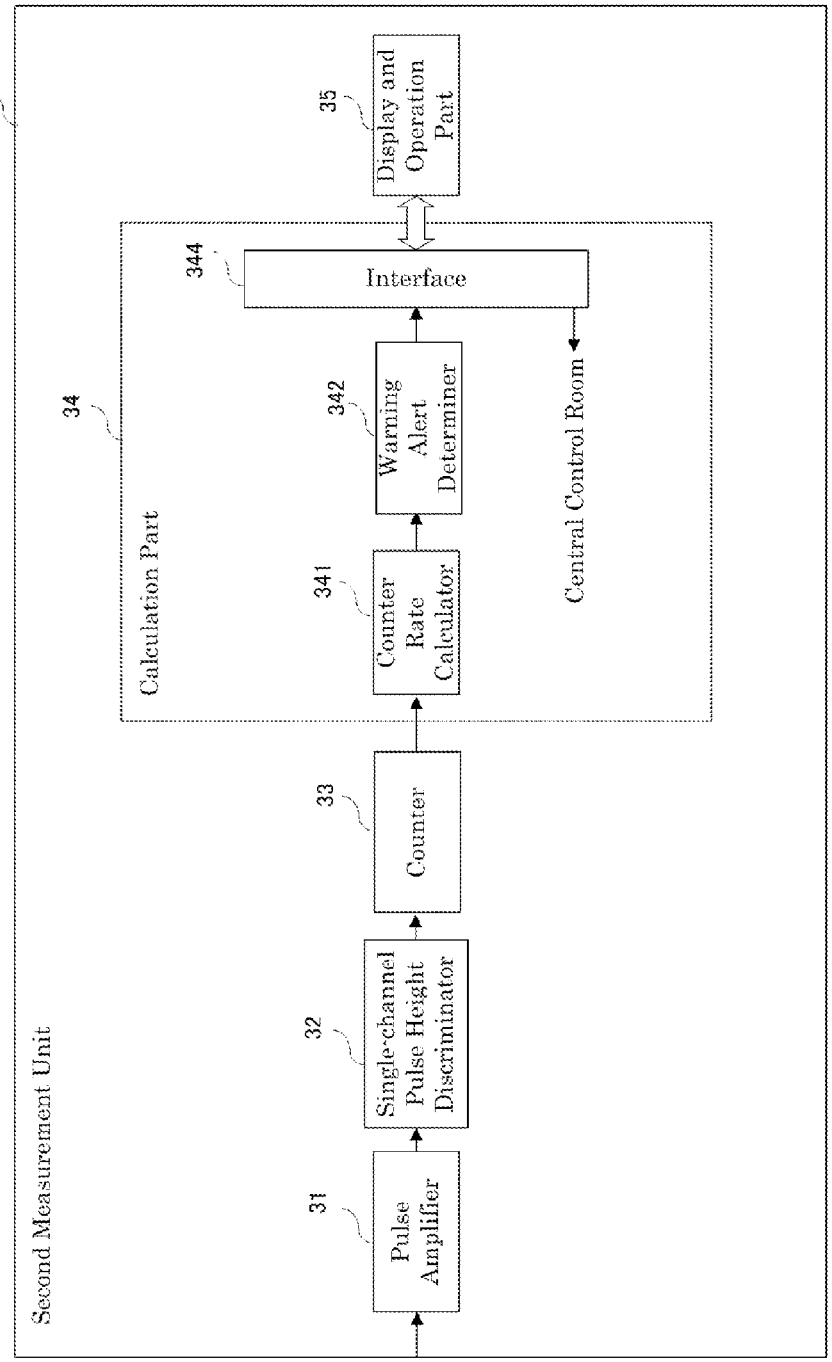
FIG. 3 is a block diagram showing a configuration of a second measurement unit according to Embodiment 1.

FIG. 3 shows a configuration of the second measurement unit 3 according to Embodiment 1. A pulse amplifier 31 receives and amplifies second detection signal pulses (second digital pulses) output from the second radiation detector 13. A single-channel pulse height discriminator 32 receives the amplified second detection signal pulses and discriminates therefrom pulses whose heights fall within the preset window, to output the discriminated digital pulses. A counter 33 counts the digital pulses to output a second count value N2. In a calculation part 34, a count rate calculator 341 receives the second count value to calculate and output a second count rate n2; a warning alert determiner 342 issues a second warning alert (a third alert) when the second count rate becomes higher than a second preset warning-alert level (a third level); and an interface 344 is connected to a central control room to control input/output of the calculation part 34. A display and operation part 35 displays the output of the calculation part 34, and allows for setting the calculation part 34 through the display and operation part.

In the count rate calculator 241, letting a standard deviation be $\sigma 1$, a time constant be $\tau 1$, a constant cycle time be $\Delta T$, and a measurement time be T1, and expressing variable values in the previous calculation cycle by suffixing "(previous)" and those in the current calculation cycle by suffixing "(current)", relations expressed by Eqs (1) to (6) shown in FIG. 4 hold true. That is, the time constant $\tau 1$ of the first measurement unit is controlled so as to be inversely proportional to the first count rate n1, whereby the standard deviation $\sigma 1$ of the first count rate results in being constant independently of the first count rate n1. This causes the measurement time T1 to be shorter and the fluctuation to be larger when the first count rate n1 increasingly varies, or the measurement time T1 to be shorter and the fluctuation to be smaller when the first count rate n1 decreasingly varies.

For each variable quantity in the count rate calculator 341, the first count rate n1, the standard deviation $\sigma 1$, the time constant $\tau 1$, the count value N1, and the measurement time T1 are replaced with the second count rate n2, a standard deviation $\sigma 2$, a time constant $\tau 2$, the count value N2, and a measurement time T2, respectively. With this replacement, Eqs. (7) to (12) shown in FIG. 5 hold true. The time constant $\tau 2$ of the second measurement unit is controlled so as to be inversely proportional to the second count rate n2, whereby the standard deviation $\sigma 2$ of the second count rate results in being constant independently of the second count rate n2, as with the count rate calculator 241. This causes the measurement time T2 to be shorter and the fluctuation to be larger when the second count rate n2 increasingly varies, or the measurement time T2 to be shorter and the fluctuation to be smaller when the second count rate n2 decreasingly varies.

Figure 6:
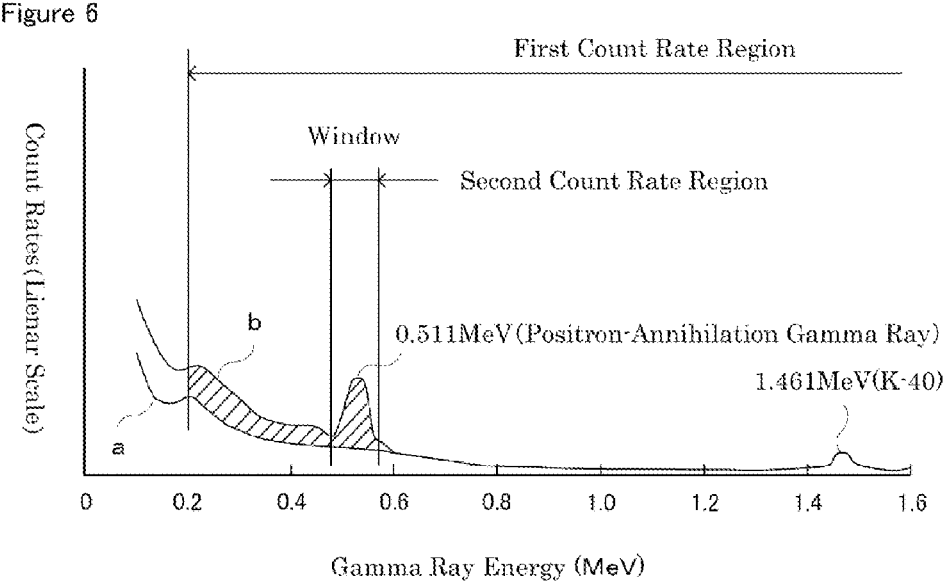
FIG. 6 is a graph showing a relationship between gamma ray energy and count rates in a pulse height spectrum.

FIG. 6 schematically shows pulse height spectrum variations due to the presence/absence of primary coolant leakage. It is assumed that the primary coolant with no fuel failure is in an ideal state. The pulse height spectrum a is a background spectrum, and the pulse height spectrum b is a spectrum under a leakage condition. In a case of no fuel failure, O-18, which is an isotope of the oxygen atom O-16 forming water molecules in the primary coolant, is radio-activated in the nuclear reactor, whereby F-18 is produced and becomes a dominant nucleus by the O-18(p,n)F-18 reaction. The two gamma rays of the same energy (0.511 MeV), which are released when positrons emitted by the decay of the F-18 are annihilated, are absorbed by the second radiation detector 13. A window (for example, 0.511 MeV±5%) is set at the spectral position of photoelectric absorption (full energy absorption) corresponding to absorption energy of the gamma rays. The single-channel pulse height discriminator 32 discriminates pulses whose heights fall within the window.

It should be noted that the pulse height spectrum here shows an extreme case of no fuel failure. Gamma rays from nuclear fission products, even though the actual area in the spectrum is small, are superimposed on the pulse height spectrum. For that reason, narrowing the window causes the background count rate to be smaller and the ratio of the net count rate of F-18 to the background count rate thereby to be larger. Accordingly, the detection sensitivity is enhanced. However, since too narrow window brings the variation of net count of F-18 to be buried in fluctuations, the detection sensitivity is contrarily lowered. Hereinafter, a background state is expressed by suffixing "(BG)".

The first count rate (BG) and the second count rate (BG) vary depending on thickness of the shield wall 14, strength of environmental gamma rays, and sizes (volumes) and gamma ray sensitivities of the respective scintillators constituting the first radiation detector 12 and the second radiation detector 13. For example, assuming a first count rate (BG) to be 50 cpm, the first count rate is calculated under the condition of a constant standard deviation $\sigma 1$ of 0.026. Likewise, assuming a second count rate (BG) to be 5 cpm, the second count rate is calculated under the condition of a constant standard deviation $\sigma 2$ of 0.052. When the first count rate (BG) is 50 cpm, the time constant $\tau 1$ (BG) is about 15 minutes. And when second count rate (BG) is 5 cpm, the time constant $\tau 2$ (BG) is about 37 minutes.

Setting the warning alert level about ten times higher the standard deviation allows for ignoring the possibility of an error alert. For example, the first warning alert level is set at approximately 60 cpm {=50 cpm×(1+10×0.026)}. Likewise, the second warning alert level is set at approximately 8 cpm {=5 cpm×(1+10×0.052)}. At this time, the net count rates are about 10 cpm in terms of the first count rate and about 3 cpm in terms of the second count rate. When the count rate (BG) increases over three times the standard deviation $\sigma$, such a change is regarded as increase in radiation from the measurement objects. At this time, the net count rates are about 4 cpm in terms of the first count rate and about 1 cpm in terms of the second count rate. Count rate variation viewed as count rate variation (BG) at the window center can be easily recognized in the trend mode display.

The detection efficiency (cpm/Bq*cm$^{-3}$) for the first count rate is approximately one-order higher than that for the second count rate. Accordingly, when fuel failure rate is high and the concentration of radioactive novel gases in the primary coolant is thereby high, indication of the first count rate increases with quick response. The concentration of F-18 in the primary coolant, on the other hand, depends on operating output of the nuclear plant. Since the concentration of F-18 is independent of the fuel failure rate in detecting leakage of the primary coolant during a constant output of the plant in normal operation, the leakage can be detected with stable sensitivity proportional to the amount of primary coolant leakage.

As described above, for the object of the radioactive gas monitoring device to detect early and reliably leakage of the primary coolant in the containment vessel, the quick response measurement of the first count rate and the quick response issue of the first warning alert are effective to detect the primary coolant leakage in a case of a high concentration of radioactive novel gases of nuclear fission products in the primary coolant due to a high fuel failure rate. Furthermore, by measuring the second count rate targeting F-18 and by setting the second warning alert level, leakage of the primary coolant in the containment vessel can be reliably detected with a stable sensitivity independent of a fuel failure rate.

A radioactive gas monitoring device according to the present embodiment includes a detector unit that introduces the air in the containment vessel as a sampled gas and has a first radiation detector detecting beta rays emitted from radioactive nuclei contained in the sampled gas to output first detection signal pulses and a second radiation detector detecting positron-annihilation gamma rays emitted from radioactive nuclei contained in the sampled gas to output second detection signal pulses; a first measurement unit that receives the first detection signal pulses to calculate and output a first count rate, and issues a warning alert when the first count rate becomes higher than a preset warning alert level and further issues a high alert when the first count rate reaches a high alert level preset above the warning alert level; and a second measurement unit that receives the second detection signal pulses to calculate and output a second count rate, and issues a warning alert when the second count rate higher than a preset warning alert level.

Furthermore, the second measurement unit of the radioactive gas monitoring device according to the present embodiment is provided with a single channel pulse height discriminator that has a window (for example, 0.511 MeV±5%) corresponding to the positron-annihilation gamma ray peak in the pulse height spectrum and discriminates, from the second detection signal pulses, pulses whose heights fall within the window to output digital pulses, and calculate the second count rate on the basis of the discriminated digital pulses. That is, the center of the window is set at 0.511 MeV in the second measurement unit.

Embodiment 2

In Embodiment 1, in the first measurement unit 2, the counter 23 counts the digital pulses output from the pulse height discriminator 22 to output the first count value, and the count rate calculator 241 in the calculation part 24 receives the first count value to calculate the first count rate. And in the second measurement unit 3, the counter 33 counts the digital pulses output from the single channel pulse height discriminator 32 to output the second count value, and the count rate calculator 341 in the calculation part 34 receives the second count value to calculate the second count rate. In Embodiment 2, the counter 23 is replaced with an increment/decrement accumulator circuit 26 in the first measurement unit 2. Likewise, the counter 33 is replaced with an increment/decrement accumulator circuit 36 in the second measurement unit 3.

Figure 7:
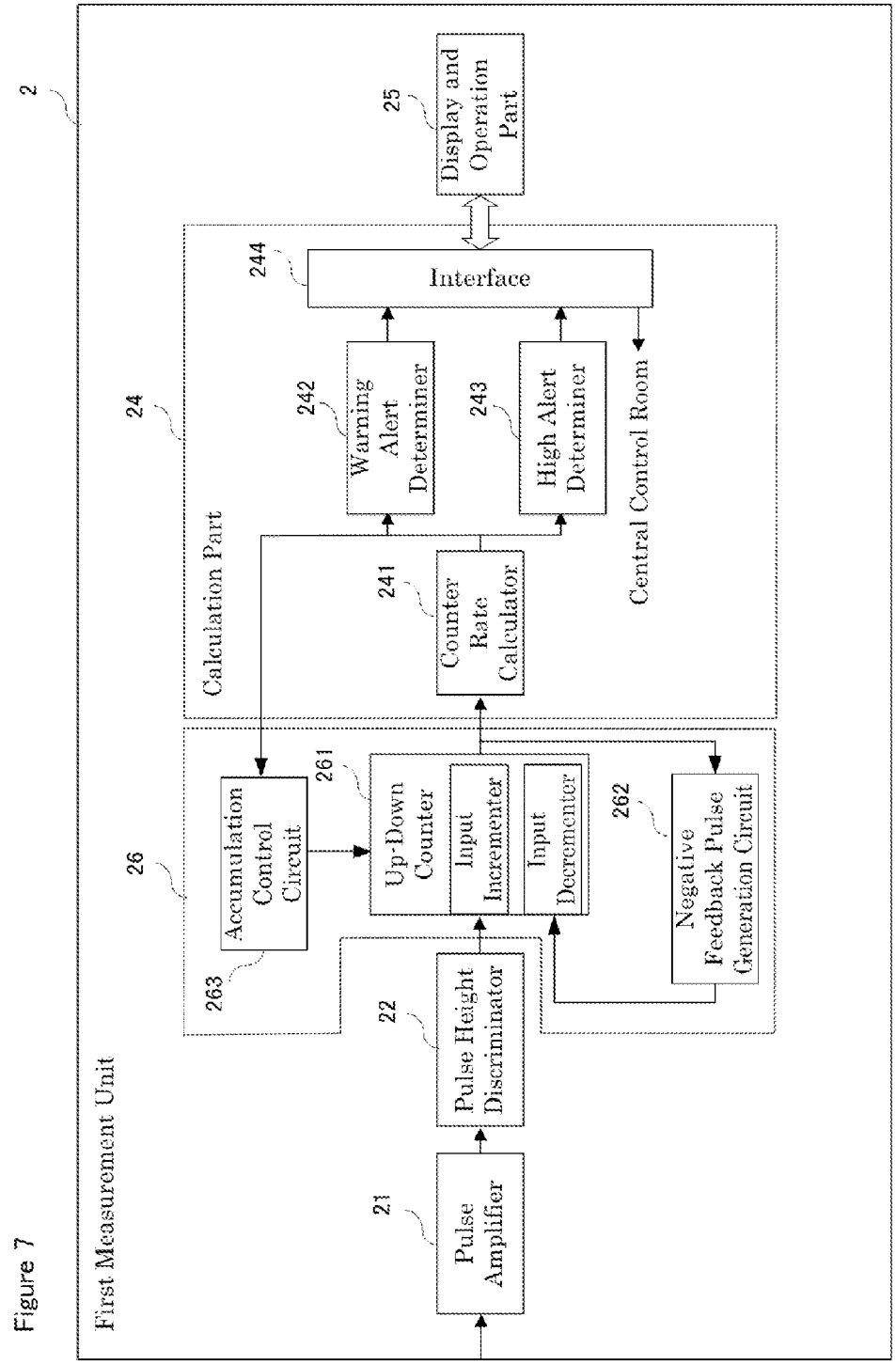
FIG. 7 is a block diagram showing a configuration of a first measurement unit according to Embodiment 2 of the present invention.

A configuration of the first measurement unit 2 according to Embodiment 2 is described with reference to FIG. 7. In the increment/decrement accumulator circuit 26, an up-down counter 261 inputs the first digital pulses to an input incrementer and inputs the output of a negative feedback pulse generation circuit 262 to an input decrementer, to output a first increment/decrement accumulated value. The negative feedback pulse generation circuit 262 receives the first increment/decrement accumulated value, to generate and to output negative feedback pulses whose repetition frequency responds with an exponential function of the first increment/decrement accumulated value. An accumulation control circuit 263 controls the up-down counter 261 so as to weightedly count the incremental input and the decremental input. For example, by optionally weighting one pulse by any one of one time, four times, thirty-two times, or sixty-four times, the time constant τ1 for the response of the repetition frequency of the negative feedback pulses output from the negative feedback pulse generation circuit 262 is inverse-proportional to the weighting.

The count rate calculator 241 receives the first increment/decrement accumulated value, to calculate and output a first count rate. Due to the effect of weighting the increment/decrement accumulated value, the first count rate responds inverse-proportionally to the time constant τ1. Letting the first increment/decrement accumulated value of the up-down counter 261 in a current calculation cycle when the incremented input and the decremented input are balanced be M1 (current) and a constant be A, a first count rate n1 (current) in the current calculation cycle is calculated by Eq. (13):

$$\text{first count rate } n1(\text{current}) = \exp\{\lambda * M1(\text{current})\} \quad (13).$$

In this way, the standard deviation σ1 of the first count rate n1 is kept constant independently of the first count rate n1 as with Embodiment 1. This causes the measurement time T1 to be shorter and the fluctuation to be larger when the first count rate n1 increasingly varies, or the measurement time T1 to be shorter and the fluctuation to be smaller when the first count rate n1 decreasingly varies.

Figure 8:
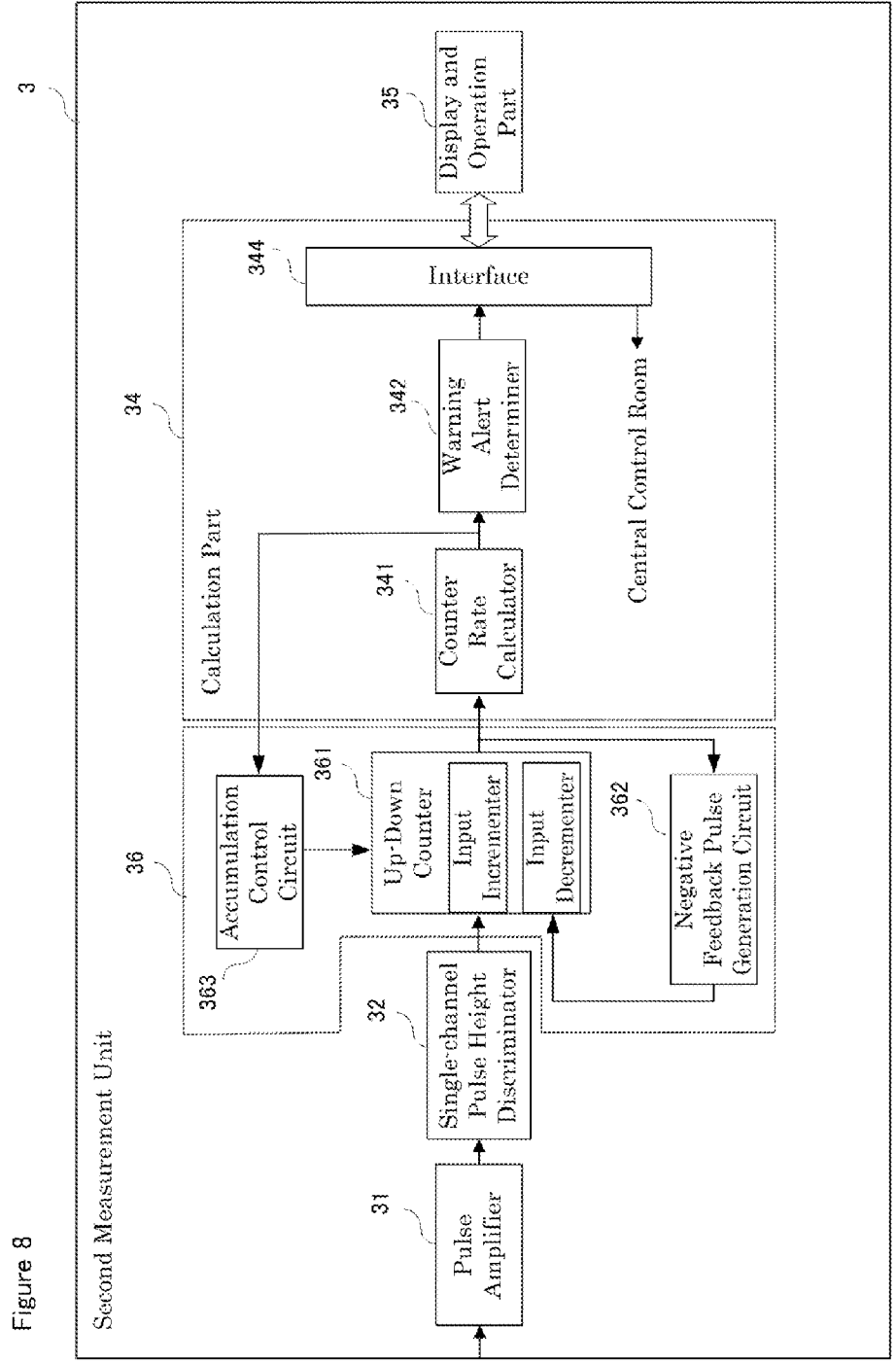
FIG. 8 is a block diagram showing a configuration of a second measurement unit according to Embodiment 2.

A configuration of the second measurement unit 3 according to the present embodiment is described with reference to FIG. 8. In the increment/decrement accumulator circuit 36, an up-down counter 361 inputs the second digital pulses to an input incrementer and inputs the output of a negative feedback pulse generation circuit 362 to an input decrementer, to output a second increment/decrement accumulated value. The negative feedback pulse generation circuit 362 receives the second increment/decrement accumulated value, to generate and to output negative feedback pulses whose repetition frequency responds with an exponential function of the second increment/decrement accumulated value. An accumulation control circuit 363 controls the up-down counter 361 so as to weightedly count the incremental input and the decremental input. For example, by optionally weighting one pulse by any one of one time, four times, thirty-two times, or sixty-four times, the time constant τ2 for the response of the repetition frequency of the negative feedback pulses output from the negative feedback pulse generation circuit 362 is inverse-proportional to the weighting.

For the variable quantities in the increment/decrement accumulator circuit 36, the first increment/decrement accumulated value M1 and the first count rate n1 are replaced with the second increment/decrement accumulated value M2 and the second count rate n2, respectively. By further replacing the initial figure of numeral reference from "2" to "3", the second increment/decrement accumulated value can be handled as with the first increment/decrement accumulated value.

With this replacement, the following Eq. (14) holds true:

$$\text{second count rate } n2(\text{current}) = \exp\{\lambda * M2(\text{current})\} \quad (14).$$

In this way, the standard deviation σ2 of the second count rate n2 is kept constant independently of the second count rate n2 as with Embodiment 1. This causes the measurement time T2 to be shorter and the fluctuation to be larger when the second count rate n2 increasingly varies, or the measurement time T2 to be shorter and the fluctuation to be smaller when the second count rate n2 decreasingly varies.

As described above, the radioactive gas monitoring device according to the present embodiment is provided in the first measurement unit 2 with the increment/decrement accumulator circuit 26 that responds with the time constant τ1 and provided in the second measurement unit 3 with the increment/decrement accumulator circuit 36 that responds with the time constant τ2. And the count rates n1 and n2 are calculated on the basis of the increment/decrement accumulated values output from the accumulator circuits so that these standard deviations σ1 and σ2 are kept constant, thus suppressing a measurement error occurring in a case of a high count rate owing to setting and resetting the control of the counters 23 and 33 in Embodiment 1.

Embodiment 3

Figure 9:
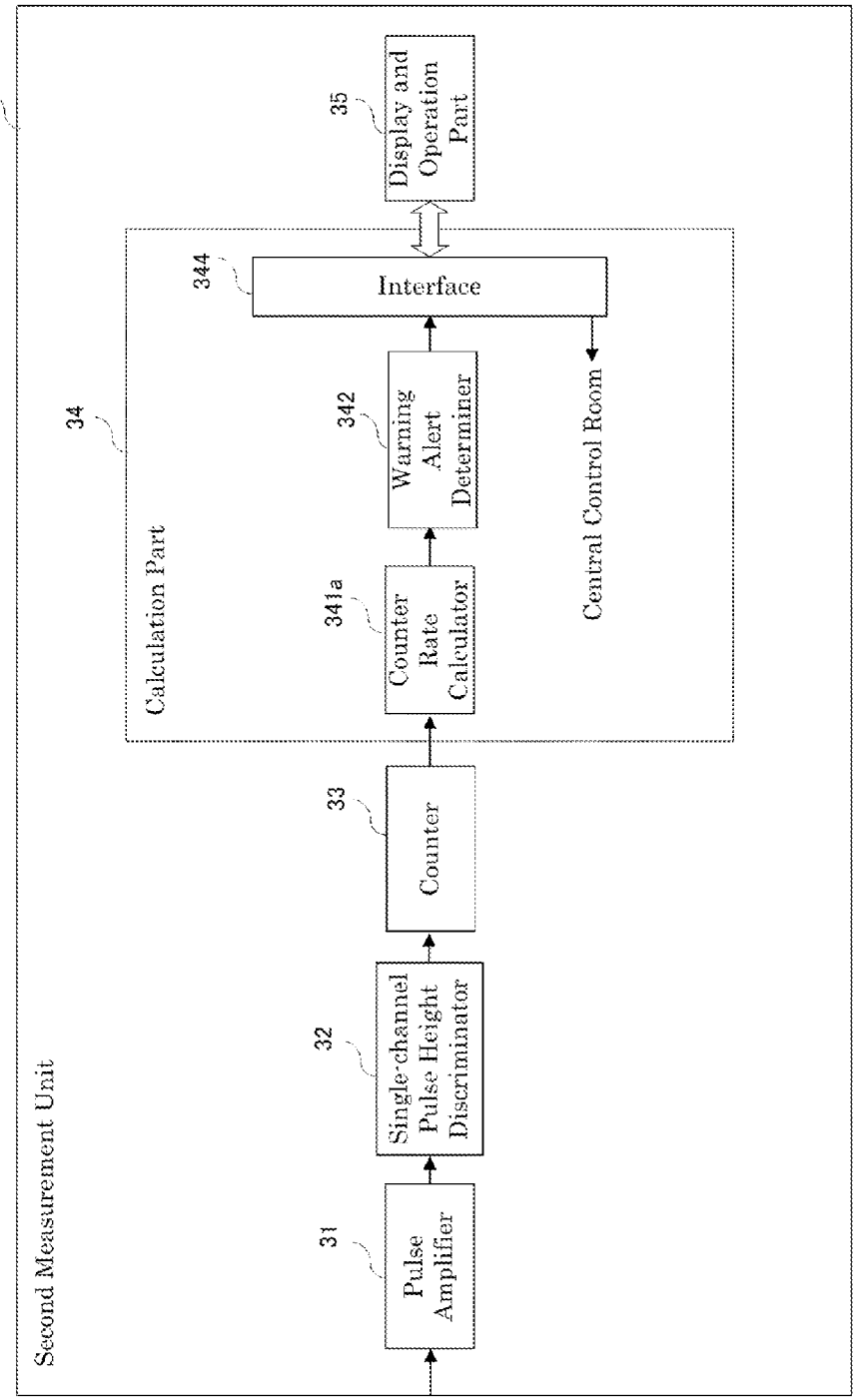
FIG. 9 is a block diagram showing a configuration of a second measurement unit according to Embodiment 3 of the present invention.

A radioactive gas monitoring device according to Embodiment 3 is described with reference to the relevant figures. FIG. 9 shows a configuration of the second measurement unit 3. In Embodiment 3, defining as a level C (a fourth level) the half of the summation value of the background count rate B (BG) and the second warning alert level A (the third level), a count rate calculator 341a in the calculation part 34 changes over the calculation methods for the second count rate at the level C as a threshold. Specifically, the second count rate is calculated under the condition of a constant measurement time until reaching the level C and calculated under the condition of a constant standard deviation when exceeding the level.

Figure 10:
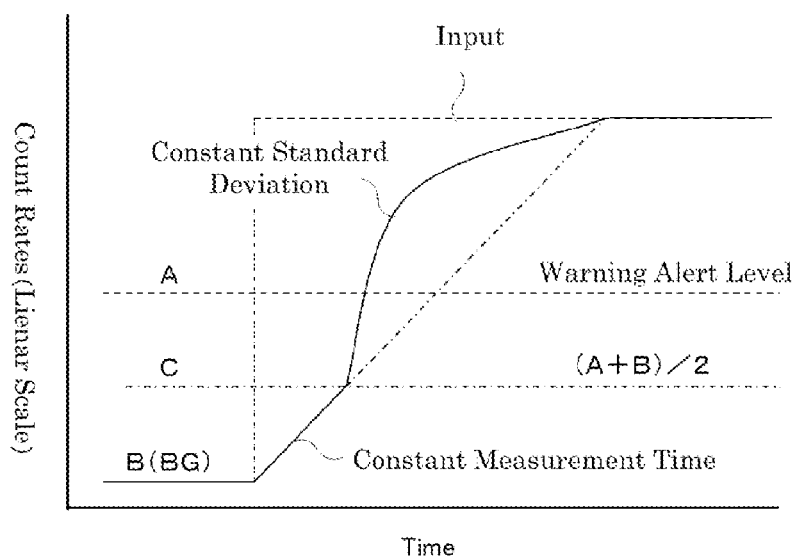
FIG. 10 is a graph showing a time response characteristic according to Embodiment 3.

FIG. 10 shows a response characteristic of the second count rate according to the present embodiment. A count rate calculator 341a updates a latest series of count values stored relating to the preset measurement time T2 until the second count rate reaches the level C, and calculates a second count rate by dividing by the measurement time T2 an accumulated value obtained by accumulating the series of count values, to output the second count rate. When the second count rate exceeds the level C, the second count rate is calculated under the condition of a constant standard deviation of the second count rate and is output. A threshold for changing back of the calculation method when the count rate reduces is set at, for example, the level of (A+B)/2 to prevent hunting.

As described above, in a range covering the ordinary fluctuation, the second count rate is calculated under the condition of a constant measurement time, so that the count rate distribution approximates to a Gaussian distribution. When the radiation from the measurement object approaches the warning alert level, the calculation method for the count rate is automatically changed over to that the constant standard-deviation method so that the response becomes quicker in inverse-proportion to the count rate. Consequently, erroneous issue of the warning alert can be prevented almost without affecting the responsivity.

The radioactive gas monitoring device according to the present embodiment is characterized in that the second measurement unit calculates the second count rate under the condition of a preset constant measurement time until the count rate reaches the half of the summation of the preset background count rate and the preset warning alert level, and calculates the second count rate so that the standard deviation thereof is kept constant when the count rate exceeds the half of the summation.

Embodiment 4

Figure 11:
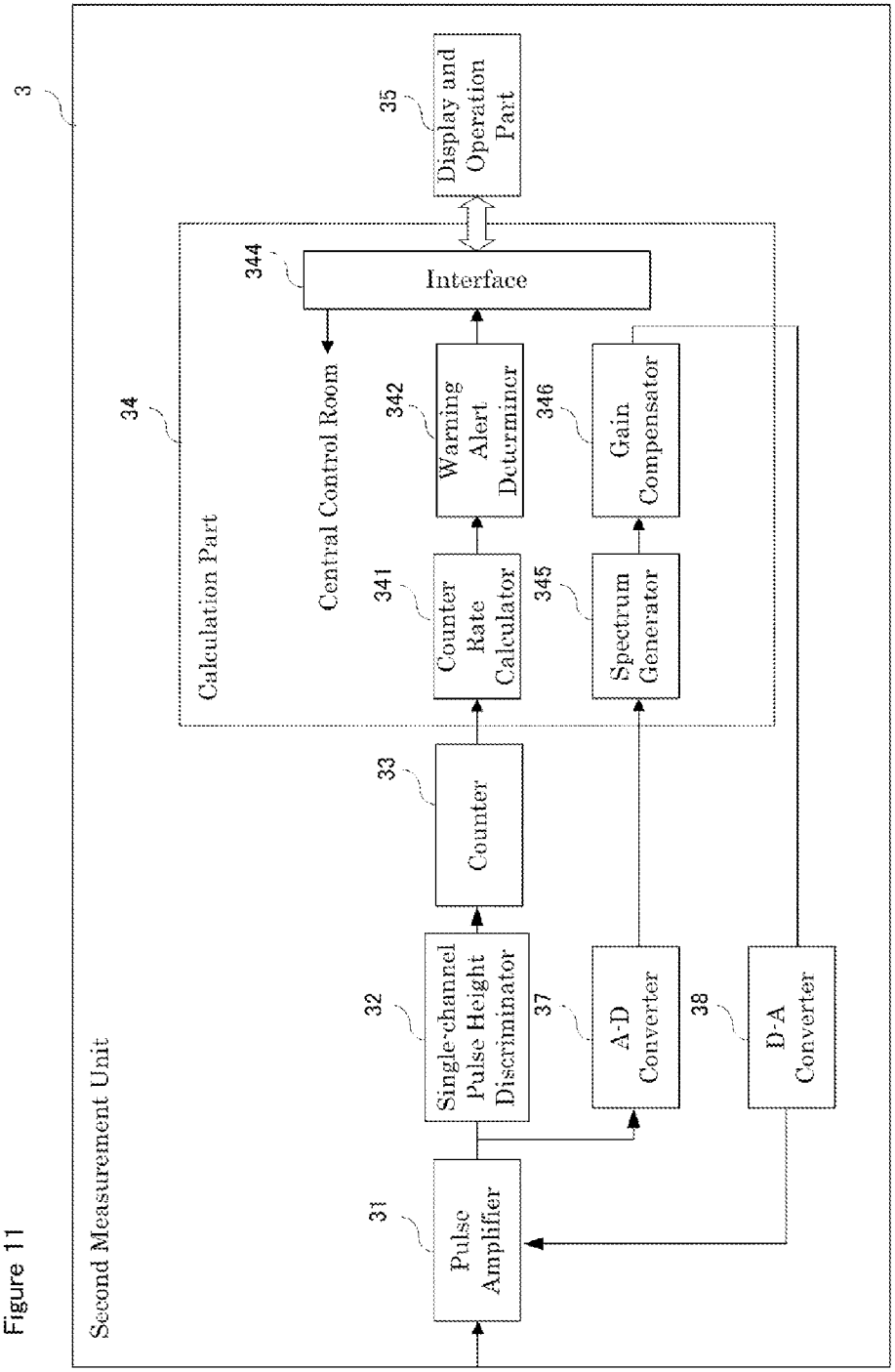
FIG. 11 is a block diagram showing a configuration of a second measurement unit according to Embodiment 4 of the present invention.

FIG. 11 shows a configuration of the second measurement unit according to Embodiment 4. The second measurement unit 3 is further provided with an A-D converter 37 and a D-A converter 38. Moreover, a calculation part 34 is further provided with a spectrum generator 345 and a gain compensator 346. The pulse amplifier 31, which is able to control its gain by externally receiving an analog control signal, receives and amplifies the second detection signal pulses to output the amplified pulses. The A-D converter 37 receives the amplified second detection signal pulses and measures their pulse heights to output the pulse heights. The spectrum generator 345 receives the pulse heights to generate a pulse height spectrum.

The second radiation detector 13 contains the gamma ray emitting natural radioactive nucleus K-40. The gain compensator 346 receives the pulse height spectrum generated by the spectrum generator 345, to output control data to the D-A converter 38 so that the gamma ray peak (1.461 MeV) of natural radioactive nuclear K-40 is located at the fixed position in the spectrum. The D-A converter 38 converts the received control data to an analog control signal to output the converted signal. The pulse amplifier 31 receives the analog control signal and controls its gain, whereby the gain between the second radiation detector 13 and the pulse amplifier 31 can be controlled constant as a system gain.

Figure 12:
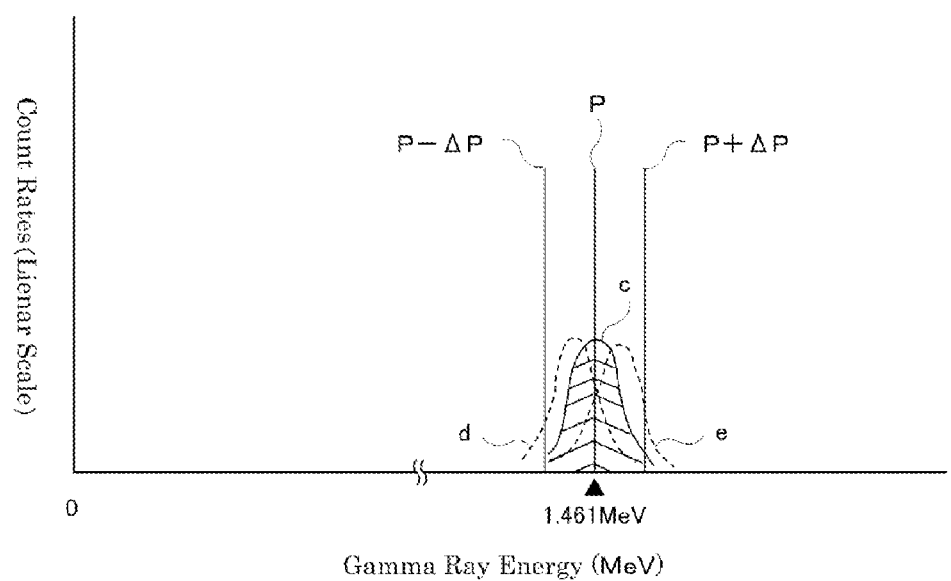
FIG. 12 is a graph illustrating a manner of gain control according to Embodiment 4.

FIG. 12 is a graph illustrating a manner of gain control by the gain compensator 346. A pulse height spectrum c is a main portion of spectrum of the gamma ray emitted from the natural radioactive nucleus K-40. The symbol P indicates the peak position (1.461 MeV) of K-40 in the gamma ray spectrum, and the symbol ΔP indicates the half of window width between both sides centered on the symbol P. For example, the gain of the pulse amplifier 31 is compensated so that a count value between P−ΔP and P (the pulse height spectrum d) and a count value between P and P+ΔP (the pulse height spectrum e) equals to each other, to control the position P to be located at the fixed position.

As described above, the radioactive gas monitoring device according to the present embodiment controls the gamma ray peak (1.461 MeV) of K-40 to be located at the fixed position in the spectrum. This allows the relationship between the gamma ray energy and the pulse height of the detection signal pulses amplified by the pulse amplifier 31 to be stabilized by compensating a drift of the second radiation detector 13 and the background count rate to be minimized by optimizing the window of the single-channel pulse height discriminator 32, thus detecting the leakage with high reliability and high sensitivity.

The radioactive gas monitoring device according to the present embodiment is characterized in that the second measurement unit includes a pulse amplifying means that receives and amplifies the second detection signal pluses; a gain compensating means that measures the spectrum of the amplified second detection signal pulses and controls the gain of the pulse amplifier for the gamma ray peak (1.461 MeV) of natural K-40 contained in the second radiation detector to be located at the fixed position in the spectrum; and a count rate calculating means that calculates and outputs a count rate on the basis of the amplified second detection signal pulses.

It should be noted that each embodiment of the present invention may be freely combined, or appropriately modified or omitted within the spirit and scope of the invention.

REFERENCE NUMERALS

1: detector unit;
11: sample chamber;
111: inlet nozzle;
112: outlet nozzle;
12: first radiation detector;
13: second radiation detector;
14: shield wall;
2: first measurement unit;
3: second measurement unit;
21: pulse amplifier;
31: pulse amplifier;
22: pulse height discriminator;
23: counter;
33: counter;
24: calculation part;
34: calculation part;
241: count rate calculator;
341: count rate calculator;
242: warning alert determiner;
342: warning alert determiner;
243: high alert determiner;
244: interface;
344: interface;
345: spectrum generator;
346: gain compensator;
25: display and operation part;
35: display and operation part;
32: single-channel pulse height discriminator;
26: increment/decrement accumulator circuit;
36: increment/decrement accumulator circuit
261: up-down counter;
361: up-down counter
262: negative feedback pulse generation circuit;
362: negative feedback pulse generation circuit;
263: accumulation control circuit
363: accumulation control circuit
37: A-D converter;
38: D-A converter; and
5: containment vessel

The invention claimed is:
1. A radioactive gas monitoring device comprising:
a sample chamber into which a sampled gas is introduced;
a plastic scintillation detector detecting radiation emitted from the sampled gas introduced into the sample chamber to output first detection signal pulses;
an inorganic crystal scintillation detector detecting radiation emitted from the sampled gas introduced into the sample chamber to output second detection signal pulses;
a first measurement unit calculating a first count rate from the first detection signal pulses to output the count rate, and issuing a first alert when the first count rate becomes higher than a first preset level and issuing a second alert when the first count rate becomes higher than a second preset level higher than the first preset level; and
a second measurement unit calculating a second count rate from the second detection signal pulses to output the count rate, and issuing a third alert when the second count rate becomes higher than a third preset level.

2. The radioactive gas monitoring device of claim 1, wherein the second measurement unit has a window whose center is set at 0.511 MeV.

3. The radioactive gas monitoring device of claim 2, wherein the first measurement unit calculates the first count rate under a condition of a constant standard deviation, and the second measurement unit calculates the second count rate under a condition of a constant standard deviation.

4. The radioactive gas monitoring device of claim 3, wherein the first count rate is inverse-proportional to a time constant of the first measurement unit, and the second count rate is inverse-proportional to a time constant of the second measurement unit.

5. The radioactive gas monitoring device of claim 2, wherein a fourth level is set to be half of a summation of the third level and a background count rate, and the second measurement unit calculates the second count rate under a condition of a constant measurement time until the second count rate reaches the fourth level and calculates the second count rate under a condition of a constant standard deviation when the count rate exceeds the fourth level.

6. The radioactive gas monitoring device of claim 1, wherein the second measurement unit calculates the second count rate from the second detection signal pulses so that the 1.461 MeV peak is located at a fixed position in a spectrum.

7. The radioactive gas monitoring device of claim 2, wherein the second measurement unit calculates the second count rate from the second detection signal pulses so that the 1.461 MeV peak is located at a fixed position in a spectrum.

8. The radioactive gas monitoring device of claim 3, wherein the second measurement unit calculates the second count rate from the second detection signal pulses so that the 1.461 MeV peak is located at a fixed position in a spectrum.

9. The radioactive gas monitoring device of claim 4, wherein the second measurement unit calculates the second count rate from the second detection signal pulses so that the 1.461 MeV peak is located at a fixed position in a spectrum.

10. The radioactive gas monitoring device of claim 5, wherein the second measurement unit calculates the second count rate from the second detection signal pulses so that the 1.461 MeV peak is located at a fixed position in a spectrum.

* * * * *